United States Patent
Ahn et al.

(10) Patent No.: US 8,183,518 B2
(45) Date of Patent: May 22, 2012

(54) TOUCH PANEL DRIVING CIRCUIT REMOVING CURRENT DUE TO HEAT OF FINGER AND TOUCH PANEL COMPRISING THE SAME

(75) Inventors: Soon-Sung Ahn, Suwon-si (KR); Yong-Sung Park, Suwon-si (KR); Do-Youb Kim, Suwon-si (KR); Deok-Young Choi, Suwon-si (KR); In-Ho Choi, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 316 days.

(21) Appl. No.: 12/502,167

(22) Filed: Jul. 13, 2009

(65) Prior Publication Data

US 2010/0012823 A1    Jan. 21, 2010

Related U.S. Application Data

(60) Provisional application No. 61/081,336, filed on Jul. 16, 2008.

(51) Int. Cl.
*G06M 7/00* (2006.01)
*G06F 3/041* (2006.01)

(52) U.S. Cl. ........................ 250/221; 345/173

(58) Field of Classification Search ............... 250/208.1, 250/214 R, 214.1, 214 A, 214 AL, 214 LA, 250/214 LS, 214 SW, 221; 345/50, 87, 102, 345/207, 173, 175, 179, 180; 348/300–310; 257/290, 292; 349/12, 61, 116; 330/59, 330/67–71, 170, 308

See application file for complete search history.

(56) References Cited

U.S. PATENT DOCUMENTS

| | | | |
|---|---|---|---|
| 5,847,594 A | 12/1998 | Mizuno | |
| 6,885,365 B1 | 4/2005 | Kang | |
| 6,921,891 B2 | 7/2005 | Seitz | |
| 7,531,776 B2 * | 5/2009 | Koide | ........................ 250/205 |
| 2005/0218302 A1 * | 10/2005 | Shin et al. | ................. 250/214 R |
| 2006/0175538 A1 | 8/2006 | Kim et al. | |
| 2006/0284998 A1 | 12/2006 | Park et al. | |
| 2007/0023614 A1 | 2/2007 | Park et al. | |
| 2007/0268206 A1 | 11/2007 | Kinoshita et al. | |

FOREIGN PATENT DOCUMENTS

| | | |
|---|---|---|
| JP | 9-298690 | 11/1997 |
| JP | 2006-285518 | 10/2006 |
| KR | 10-2006-0090349 | 8/2006 |
| KR | 10-2006-0133165 | 12/2006 |
| KR | 10-2007-0015767 | 2/2007 |

OTHER PUBLICATIONS

Korean Registration Determination Certificate dated Jan. 24, 2011, for Priority Korean Application 10-2008-0110486, 5 pages.

* cited by examiner

*Primary Examiner* — Que T Le
*Assistant Examiner* — Don Williams
(74) *Attorney, Agent, or Firm* — Christie, Parker & Hale, LLP (57) ABSTRACT

Provided is a driving circuit of a photosensing touch panel including: a first photodiode coupled between a first voltage source and a sensing node and for generating a first current in accordance with a brightness of an external incident light and a heat of a finger; a second photodiode coupled between the sensing node and a second voltage source and for generating a second current in accordance with the heat of the finger, the second photodiode being shielded from the external incident light; and an amplifier circuit for detecting the brightness of the external incident light regardless of the heat of the finger by subtracting the second current from the first current at the sensing node.

29 Claims, 5 Drawing Sheets

TOUCH PANEL DRIVING CIRCUIT REMOVING CURRENT DUE TO HEAT OF FINGER AND TOUCH PANEL COMPRISING THE SAME

CROSS-REFERENCE TO RELATED PATENT APPLICATION

This application claims priority to and the benefit of U.S. Provisional Patent Application No. 61/081,336 filed, Jul. 16, 2008, the entire content of which is incorporated herein by reference.

BACKGROUND OF THE INVENTION

1. Field of the Invention

The present invention relates to a touch panel driving circuit and a touch panel including the same, and more particularly, to a driving circuit of a photosensing type touch panel and a touch panel including the driving circuit.

2. Description of the Related Art

Typically, input signals are applied to computers using a mouse, a keyboard, or other input devices. A remote control may also be used to select functions of digital televisions. However, users who are not skilled in using a mouse, keyboard, remote control, or the like have difficulty using these input devices.

Touch panels or touch screens are input devices aimed at users having difficulty using the conventional input devices mentioned above. Input of command signals, which is conventionally performed using a mouse or the like, can be performed by directly contacting a finger, pen, etc. onto a display panel with a touch panel.

Since the command signals can be input by contacting the finger onto the display panel, users having difficulty using input devices such as a mouse and a keyboard can easily use digital devices, such as computers, using such touch panels or touch screens. Touch panels can be classified into several groups based on a method of recognizing an external input: capacitive touch panels; resistive overlay touch panels; infrared beam touch panels; ultrasonic wave touch panels; integral strain gauge touch panels; piezo electric touch panels; photosensing type touch panels; etc.

In a photosensing type touch panel, which includes a photodiode, contact by a finger is recognized by detecting a current generated when light is incident on the photodiode. Photodiodes, which are elements utilized in the photosensing process, may be formed when driving circuits of display panels, such as LCD and OLED display panels, are formed. In addition, the thickness of such a photosensing type touch panel may be decreased since additional layers, which need to be formed outside of a resistive overlay touch panel or a capacitive touch panel, are not necessary.

However, the current generated in the photodiode is affected by the brightness of the light which is incident on the photodiode, and temperature of the photodiode or peripheral regions of the photodiode.

Figure 1:
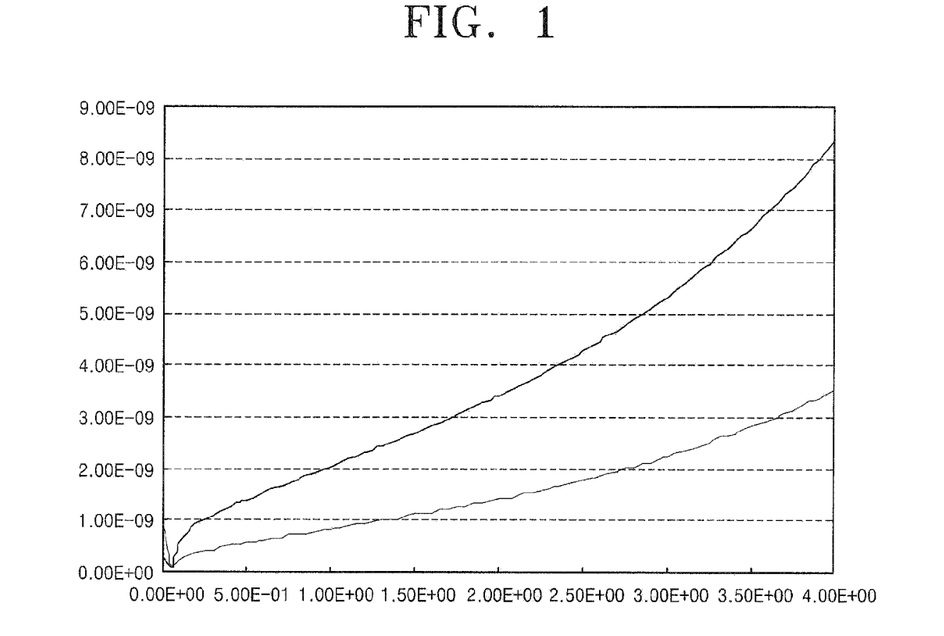
FIG. 1 is a graph illustrating current flowing in a photodiode with respect to the brightness of the light incident on the photodiode at two different temperatures.

FIG. 1 is a graph of current flowing in a photodiode with respect to the brightness of the light incident on the photodiode, at two different temperatures. The X-axis of the graph represents the brightness of the light incident on the photodiode, and the Y-axis represents current flowing in the photodiode. The upper curve represents current when the temperature is 40° C., and the lower curve represents current when the temperature is 25° C. Referring to FIG. 1, as the temperature increases, a larger amount of current flows in the photodiode at the same brightness.

Figure 2:
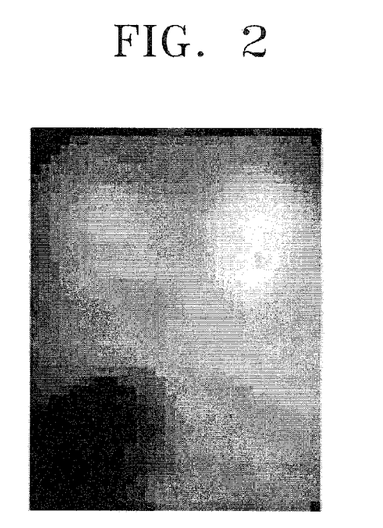
FIG. 2 is a photographic image illustrating a temperature change in peripheral regions of a contact point of a finger on a touch panel.

FIG. 2 is a photographic image showing a temperature increase in peripheral regions of a contact point of a finger on a touch panel due to the heat of the finger. Referring to FIG. 2, temperature is increased in a circular region in the upper right hand corner which is brighter than peripheral regions.

As described above, when a user touches a touch panel with a finger, the temperature of peripheral regions of the contact point of the photodiode is increased by the heat of the finger, and thus the current generated from the photodiode is changed by the temperature increase. As a result, since the current of the photodiode is affected by not only the brightness of the light incident on the photodiode, but also the temperature of the finger, the result of detecting the contact of the finger may cause an error if the effect of the heat of the finger is not considered.

SUMMARY OF THE INVENTION

An aspect of an embodiment of the present invention is directed toward a driving circuit of a photosensing type touch panel, which removes current generated by the heat of a finger, and a touch panel including the driving circuit.

An embodiment of the present invention provides a driving circuit of a photosensing touch panel including: a first photodiode coupled between a first voltage source and a sensing node and for generating a first current in accordance with a brightness of an external incident light and a heat of a finger; a second photodiode coupled between the sensing node and a second voltage source and for generating a second current in accordance with the heat of the finger, the second photodiode being shielded from the external incident light; and an amplifier circuit for detecting the brightness of the external incident light regardless of the heat of the finger by subtracting the second current from the first current at the sensing node.

The driving circuit may further include a switch coupled between the amplifier circuit and an output line and for selectively supplying a third current, generated according to the brightness of the external incident light regardless of the heat of the finger, to a data output line in accordance with a scan signal applied to the switch.

The driving circuit may further include a capacitor coupled between the sensing node and a third voltage source and for maintaining the third current when the scan signal is applied to the switch.

The driving circuit may further include an initializer for selectively applying an initiation voltage to the sensing node to reset both the first photodiode and the second photodiode.

The initialization voltage applied to the sensing node may be set to be a voltage when the first current is identical to the second current at 0 Lux.

The first photodiode may include an anode electrode connected to the first voltage source and a cathode electrode connected to the sensing node, and wherein the second photodiode may include an anode electrode connected to the sensing node and a cathode electrode connected to the second voltage source.

The driving circuit may further include a first transistor including a first electrode connected to a third voltage source, a second electrode connected to the sensing node, and a gate electrode connected to an initiation line.

The first voltage source may have a lower voltage level than the third voltage source, and wherein the second voltage source may have a higher voltage level than the third voltage source.

The amplifier circuit may include a second transistor including a first electrode, a second electrode connected to a fourth voltage source, and a gate electrode connected to the sensing node.

Each of the first voltage source and the fourth voltage source may have a lower voltage level than the third voltage source, and wherein the second voltage source may have a higher voltage level than the third voltage source.

The driving circuit may further include a third transistor including a first electrode connected to a data output line, a second electrode connected to the first electrode of the second transistor, and a gate electrode connected to a scan line.

The driving circuit may further include a capacitor including a first terminal connected to the sensing node and a second terminal connected to a fifth voltage source.

Each of the first voltage source, the fourth voltage source, and the fifth voltage source may have a lower voltage level than the third voltage source, and wherein the second voltage source may have a higher voltage level than the third voltage source.

The driving circuit may further include a fourth transistor including a first electrode connected to the second electrode of the second transistor, a second electrode connected to the fourth voltage source, and a gate electrode connected to the scan line.

The third transistor may be for selectively supplying a third current, generated according to the brightness of the external incident light regardless of the heat of the finger, to the data output line in accordance with a scan signal, and wherein the fourth transistor may be for selectively floating the second transistor in accordance with the scan signal.

Another embodiment of the present invention provides a photosensing touch panel including: a pixel circuit; a touch panel driving circuit; and a scan line shared by both the pixel circuit and the touch panel driving circuit, the pixel circuit being configured to receive a data signal from a data line in response to a scan signal applied to the scan line; the touch panel driving circuit including: a first photodiode coupled between a first voltage source and a sensing node and for generating a first current in accordance with a brightness of an external incident light and a heat of a finger; a second photodiode coupled between the sensing node and a second voltage source and for generating a second current in accordance with the heat of the finger, the second photodiode being shielded from the external incident light; an amplifier circuit for detecting the brightness of the external incident light regardless of the heat of the finger by subtracting the second current from the first current at the sensing node; and a switch coupled between the amplifier circuit and an output line and for selectively supplying a third current, generated according to the brightness of the external incident light regardless of the heat of the finger, to a data output line in accordance with the scan signal applied to the scan line.

The switch may include a third transistor including a first electrode connected to the data output line, a second electrode connected to the first electrode of the second transistor, and a gate electrode connected to the scan line.

The touch panel driving circuit may include a capacitor including a first terminal connected to the sensing node and a second terminal connected to a fifth voltage source.

The touch panel driving circuit may include a fourth transistor including a first electrode connected to the second electrode of the second transistor, a second electrode connected to the fourth voltage source, and a gate electrode connected to the scan line.

The pixel circuit may include an organic light emitting diode (OLED).

The photosensing touch panel may further include: a scan driving unit for applying the scan signal to the scan line; a data driving unit for applying the data signal to the data line; and a sensing output unit for receiving the third current from the data output line and for converting the third current to brightness data.

The photosensing touch panel may further including: a controller for controlling operations of the scan driving unit, the data driving unit, and the sensing output unit and for receiving the brightness data from the sensing output unit.

The photosensing touch panel may further include: a reset driving unit for applying a reset signal to an initiation line connected to the initializer.

The photosensing touch panel may further include: a controller for controlling operations of the scan driving unit, the data driving unit, the reset driving unit, and the sensing output unit and for receiving the brightness data from the sensing output unit.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

The present invention will now be described more fully with reference to the accompanying drawings, in which exemplary embodiments of the invention are shown. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 3:
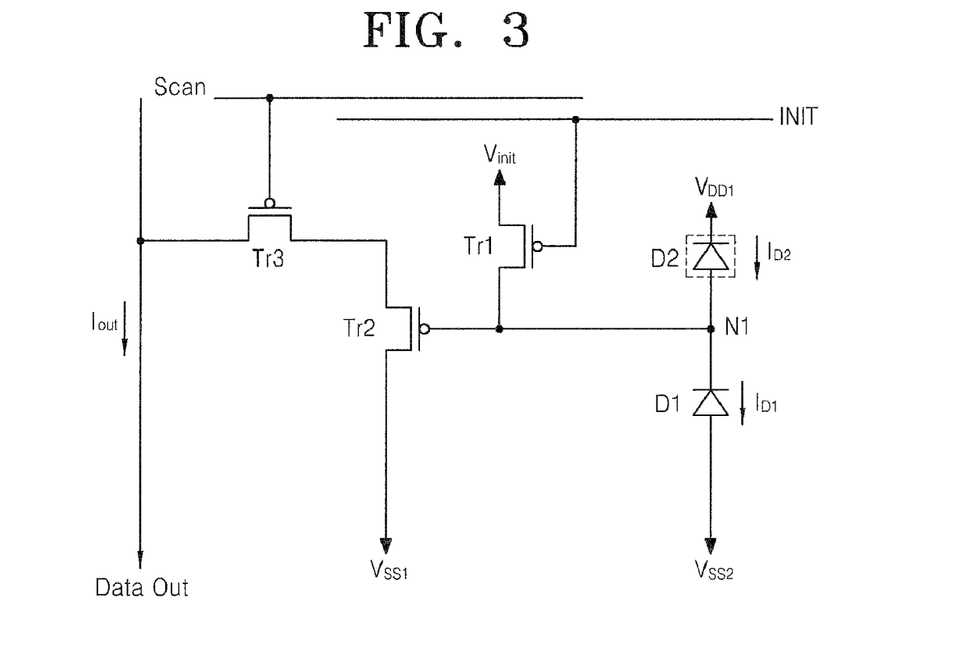
FIG. 3 schematically illustrates a touch panel driving circuit according to an embodiment of the present invention.

FIG. 3 schematically illustrates a touch panel driving circuit according to an embodiment of the present invention.

Referring to FIG. 3, the touch panel driving circuit according to an embodiment of the present invention includes first to third transistors Tr1, Tr2, and Tr3, a first photodiode D1, and a second photodiode D2. In addition, the photosensing circuit may further include a scan line Scan, an initiation line INIT, and a data output line Data Out.

The first photodiode D1 generates current when external light is incident on the first photodiode D1. The first photodiode D1 includes an anode electrode and a cathode electrode. The anode electrode of the first photodiode D1 is connected to a second ground voltage source $V_{SS2}$. The cathode electrode of the first photodiode D1 is connected to a first node N1. In photodiodes, the voltage applied to the cathode electrode is greater than that applied to the anode electrode, unlike normal diodes. Thus, the voltage of the second ground voltage source $V_{SS2}$ may be less than an initiation voltage $V_{init}$, which will be described in more detail later.

The second photodiode D2, as a dark diode, generates current only with respect to temperature and not light. In order to prevent current from being generated when external light is incident on the second photodiode D2, a barrier for blocking light may be formed around the second photodiode D2. The second photodiode D2 includes an anode electrode and a cathode electrode. The anode electrode of the second photodiode D2 is connected to the first node N1. A first voltage source $V_{DD1}$ is connected to the cathode electrode of the second photodiode D2. As in the first photodiode D1, the voltage of the first voltage source $V_{DD1}$ (connected to the cathode electrode) may be greater than the initiation voltage $V_{init}$.

Each of the first transistor Tr1, the second transistor Tr2, and the third transistor Tr3 includes a first electrode, a second electrode, and a gate electrode.

The first transistor Tr1 provides the initiation voltage $V_{init}$ to the first photodiode D1 and the second photodiode D2. The initiation voltage $V_{init}$ is greater than the voltage of the second ground voltage source $V_{SS2}$, which is applied to the anode electrode of the first photodiode D1, and less than the voltage of the first voltage source $V_{DD1}$, which is applied to the cathode electrode of the second photodiode D2. The initiation voltage $V_{init}$ is applied to the first electrode of the first transistor Tr1. The second electrode of the first transistor Tr1 is connected to the first node N1. In addition, the gate electrode of the first transistor Tr1 is connected to the initiation line INIT. The initiation line INIT applies a reset signal, applied from a reset driving unit (e.g., that is externally installed), to the gate electrode of the first transistor Tr1 so as to apply the initiation voltage $V_{init}$ to the first node N1.

The second transistor Tr2 allows current to flow according to the brightness of the light incident on the photosensing circuit. The gate electrode of the second transistor Tr2 is connected to the first node N1. Voltage of a first ground voltage source $V_{SS1}$ is applied to the second electrode of the second transistor Tr2.

The third transistor Tr3 performs a switching function such that current generated according to the brightness of the incident light is supplied to an external device through the data output line Data Out. The first electrode of the third transistor Tr3 is connected to the data output line Data Out. The second electrode of the third transistor Tr3 is connected to the first electrode of the second transistor Tr2. The gate electrode of the third transistor Tr3 is connected to the scan line Scan so that a scan signal is applied to the gate electrode of the third transistor Tr3.

The scan line Scan transmits a scan signal to the touch panel driving circuit. The scan lines Scan are formed in each row of touch panel driving circuits, which are formed in matrix shape. If a scan signal is applied to a scan line Scan, a touch panel driving circuit connected to the scan line Scan to which the scan signal is applied allows current due to the incident light to flow out.

The initiation line INIT applies a reset signal to the touch panel driving circuit, which turns on ON the first transistor Tr1 in order to provide a voltage to the first node N1.

Current transmitted by the second transistor Tr2 flows through the data output line Data Out. The brightness of the light incident on the touch panel driving circuit is detected by measuring the amount of the current or the amount of charge accumulated by the current.

Operations of the touch panel driving circuit of FIG. 3 will now be described in more detail. First, a reset signal is applied to the gate electrode of the first transistor Tr1 through the initiation line INIT. When the reset signal is applied to the gate electrode of the first transistor Tr1, the first transistor Tr1 is turned on ON so that the initiation voltage $V_{init}$, which is applied to the first electrode of the first transistor Tr1, is applied to the first node N1. Thus, the cathode electrode of the first photodiode D1 and the anode electrode of the second photodiode D2 have a constant initiation voltage $V_{init}$ due to the application of the reset signal.

After the reset signal is applied to the gate electrode of the first transistor Tr1, integration is performed. During the integration period, charges flow from the cathode electrode of the first photodiode D1 to the first node N1 according to brightness of light incident on the touch panel driving circuit and the peripheral temperature. That is, a first current $I_{D1}$ flows from the cathode electrode of the first photodiode D1 to the anode electrode of the first photodiode D1.

Meanwhile, in the second photodiode D2, a second current $I_{D2}$ due to the peripheral temperature flows from the cathode electrode of the second photodiode D2 to the anode electrode of the second photodiode D2 regardless of the light incident on the photosensing circuit.

As a result, a current corresponding to the difference between the first current $I_{D1}$ and the second current $I_{D2}$ flows from the gate electrode of the second transistor Tr2 to the first node N1. Thus, the electric potential of the first node N1 is decreased.

When the integration period is terminated, a scan signal is applied to the gate electrode of the third transistor Tr3 via the scan line Scan. When the third transistor Tr3 is turned on ON by the scan signal, an output current $I_{out}$ corresponding to the difference between the voltage of the first ground voltage source $V_{SS1}$ and the voltage of the gate electrode of the second transistor Tr2 flows through the data output line Data Out.

As described above, current generated by the heat of the finger may be removed by further including the second photodiode D2 which generates current only according to temperature by blocking externally incident light to the second photodiode D2. Thus, brightness of the light may be accurately detected.

That is, in one embodiment of the present invention, the driving circuit is in a photosensing touch panel. The driving circuit includes the first photodiode D1, the second photodiode D2, and an amplifier circuit. The first photodiode D1 is coupled between the second ground voltage source $V_{SS2}$ and the first node (or sensing node) N1 and is for generating the first current $I_{D1}$ in accordance with the brightness of the externally incident light and the heat of the finger touching the touch panel. The second photodiode D2 is coupled between the sensing node N1 and the first voltage source $V_{DD1}$ and is for generating the second current $I_{D2}$ in accordance with the heat of the finger. The second photodiode (D2) is shielded from the externally incident light. Here, the amplifier circuit (e.g., transistors Tr1, Tr2, and Tr3, scan line Scan, initiation line INIT, data output line Data Out, etc.) is coupled to the first photodiode D1 and the second photodiode D2 to detect the brightness of the external incident light, regardless of the heat of the finger, by subtracting the second current $I_{D2}$ from the first current $I_{D2}$ at the sensing node N1.

Figure 4:
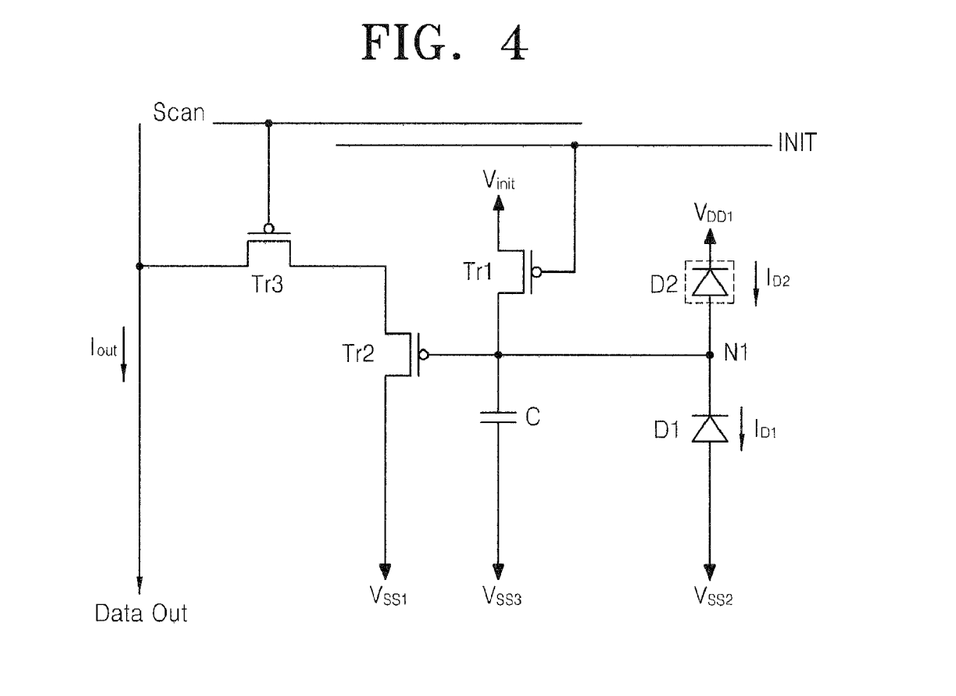
FIG. 4 schematically illustrates a touch panel driving circuit according to another embodiment of the present invention.

FIG. 4 illustrates a touch panel driving circuit according to another embodiment of the present invention.

Referring to FIG. 4, the touch panel driving circuit according to an embodiment of the present invention, like the touch panel driving circuit of FIG. 3, includes a first diode D1, a second diode D2, and first through third transistors Tr1 to Tr3. The touch panel driving circuit of FIG. 4 further includes a capacitor C.

The capacitor C is utilized to more uniformly (or constantly) maintain the electric potential of the gate electrode of the second transistor Tr2. Further, the capacitor C includes a first terminal and a second terminal. The first terminal of the capacitor C is connected to the first node N1. Voltage of a third ground voltage source $V_{SS3}$ is applied to the second terminal of the capacitor C.

Since the touch panel driving circuit of FIG. 4 further includes the capacitor C, the output current $I_{out}$, which flows through the data output line Data Out may be more uniformly (or constantly) maintained while the scan signal is applied to the gate electrode of the third transistor Tr3. As a result, the current generated by the heat of the finger may be removed as described with reference to the touch panel driving circuit of FIG. 3, and errors of the detected results may be reduced.

Figure 5:
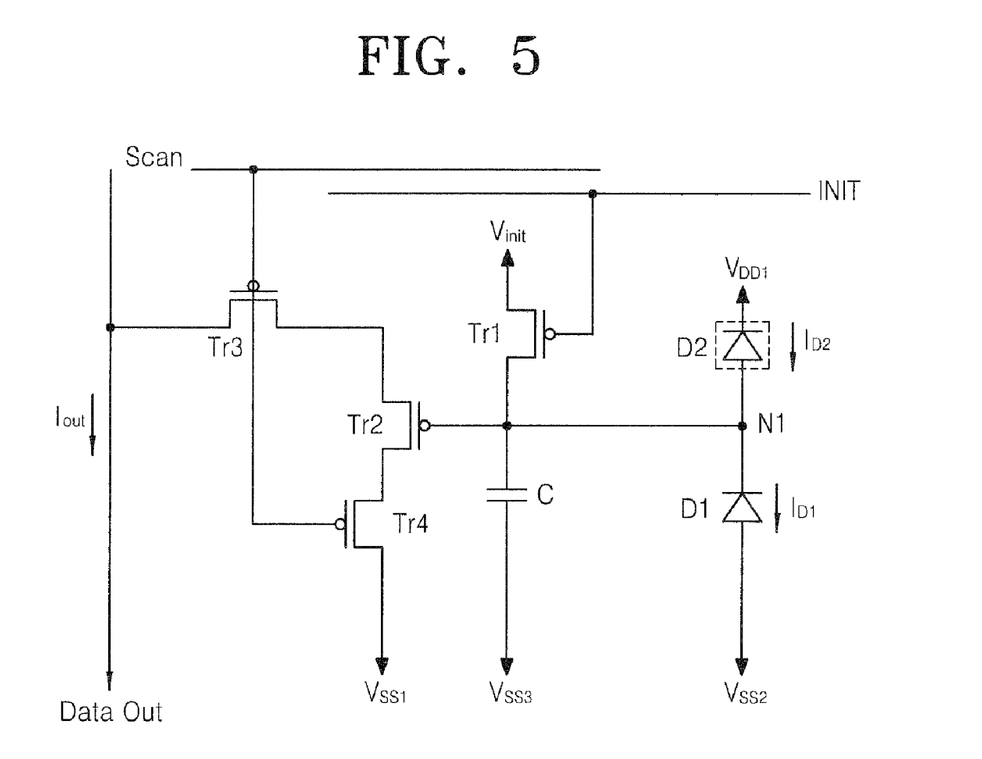
FIG. 5 schematically illustrates a touch panel driving circuit according to another embodiment of the present invention.

FIG. 5 illustrates a touch panel driving circuit according to another embodiment of the present invention.

Referring to FIG. 5, the touch panel driving circuit according to an embodiment of the present invention, like the touch panel driving circuit of FIG. 3, includes a first diode D1, a second diode D2, first to third transistors Tr1 to Tr3, and a capacitor C. The touch panel driving circuit of FIG. 5 further includes a fourth transistor Tr4.

The fourth transistor Tr4 includes a first electrode, a second electrode, and a gate electrode. The first electrode of the fourth transistor Tr4 is connected to the second electrode of the second transistor Tr2. Voltage of the first ground voltage source $V_{ss1}$ is applied to the second electrode of the fourth transistor Tr4. In addition, the gate electrode of the fourth transistor Tr4 is connected to a scan line Scan, and a scan signal is applied to the gate electrode of the fourth transistor Tr4.

Since the touch panel driving circuit of FIG. 5 further includes the fourth transistor Tr4, the second transistor Tr2 is in a floating state before a logic low scan signal is applied thereto from the scan line Scan. Accordingly, during integration period, the second transistor Tr2 is prevented from operating.

Figure 6:
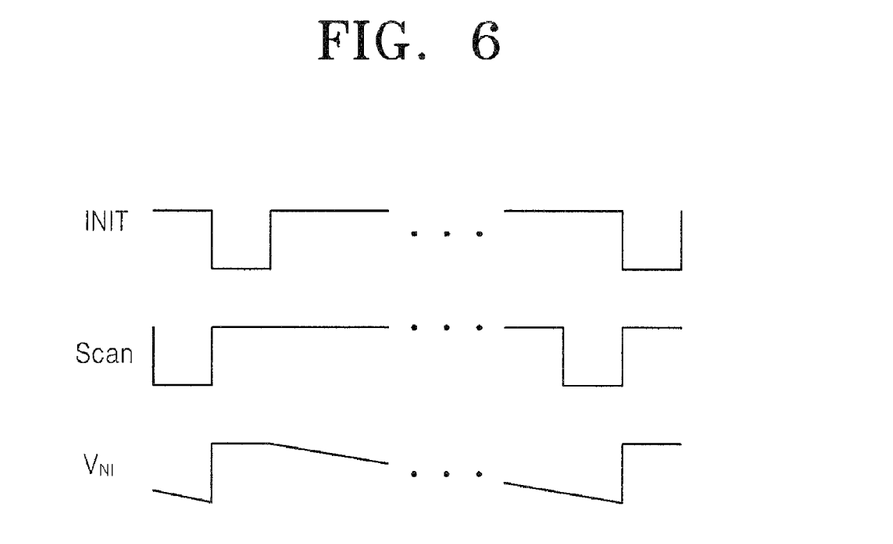
FIG. 6 schematically illustrates waveforms of driving signals and electric potential of a first node for driving a touch panel driving circuit according to an embodiment of the present invention.

FIG. 6 illustrates waveforms of driving signals and an electric potential of a first node for driving a touch panel driving circuit according to an embodiment of the present invention. The waveform of FIG. 6 may be applied to operations of the touch panel driving circuits of FIGS. 3 to 5.

Referring to FIG. 6, if a scan signal is applied to a scan line Scan, the third transistor Tr3 of the touch panel driving circuit, which is connected to the scan line Scan, is turned on ON. When the third transistor Tr3 is turned on ON, data representing the brightness of the incident light is output. Since the third transistor Tr3 of each of the touch panel driving circuits of FIGS. 3 to 5 is a PMOS transistor, a logic high signal is normally applied to the third transistor Tr3, and a logic low signal is applied to the third transistor Tr3 to turn on the third transistor Tr3.

After the data output operation is terminated, the first transistor Tr1 is turned on ON by applying a reset signal to an initiation line INIT. When the first transistor Tr1 is turned on ON, electric potential of the first node N1 is set to the initiation voltage $V_{init}$ in every cycle. Since the first transistor Tr1 of each of the touch panel driving circuits of FIGS. 3 to 5 is a PMOS transistor like (the third transistor Tr3), a logic high signal is normally applied to the first transistor Tr1, and a logic low signal is applied to the first transistor Tr1 to turn on the first transistor Tr1.

After the initiation is terminated, the first photodiode D1 and the second photodiode D2 generate current according to the brightness of externally incident light during the integration period. Due to the current, the electric potential of the first node N1 is gradually decreased.

When the integration period is terminated, a scan signal of the next cycle is applied to the scan line Scan.

As described above, the contact of the finger can be detected by repeating the data output operation by the scan signal, the initiation operation by the reset signal, and integration during the integration period.

While PMOS transistors are used in the touch panel driving circuits according to the embodiments described above, the present invention is not limited thereto, and NMOS transistors may also be used. If NMOS transistors are used, a logic low signal is normally applied to the transistor, and a logic high signal is applied to the transistor to turn on the transistor.

In addition, according to FIGS. 3 to 5, the cathode electrode of the first photodiode D1 and the anode electrode of the second photodiode D2 are connected to the first node N1 in the touch panel driving circuit, but the positions of the first photodiode D1 and the second photodiode D2 may be changed. If the positions are changed, initiation voltage $V_{init}$ may be lower than the initiation voltage $V_{init}$ applied to the photosensing circuits according to FIGS. 3 to 5. While the electric potential of the first node N1 is decreased during the initiation period in the photosensing circuit according to FIGS. 3 to 5, the electric potential of the first node N1 is increased during the initiation period when the positions of the first photodiode D1 and the second photodiode D2 are changed. Thus, by lowering the initiation voltage $V_{init}$, it is possible to prevent the voltage of the gate electrode of the second transistor Tr2 from moving into the saturation region.

The touch panel driving circuits according to FIGS. 3 to 5 include the first transistor Tr1 in order to apply an initial voltage to the first node N1. However, the first transistor Tr1 may not be included in the touch panel driving circuit. An initial voltage of the first node N1 may be applied in a touch panel driving circuit in which the first transistor Tr1 is not included.

In order to apply an initial voltage to the first node N1 in a touch panel driving circuit not including the first transistor Tr1, the first voltage source $V_{DD1}$ or the second ground voltage source $V_{SS2}$ needs to be controlled by an externally installed device. Thus, the above-described modified touch panel driving circuit may further include a voltage control unit. For example, data representing the brightness of the incident light may be output by applying the scan signal to the gate electrode of the third transistor Tr3 from the scan line Scan, and then the voltage of the second ground voltage source $V_{SS2}$ is increased to the initiation voltage $V_{init}$. Then, the voltage applied to both electrodes of the first photodiode D1 is forward biased, and thus the voltage of the first node N1 becomes $V_{init}$. Accordingly, an initial voltage may be applied to the first node N1 in a touch panel driving circuit not including the first transistor Tr1.

Figure 7A:
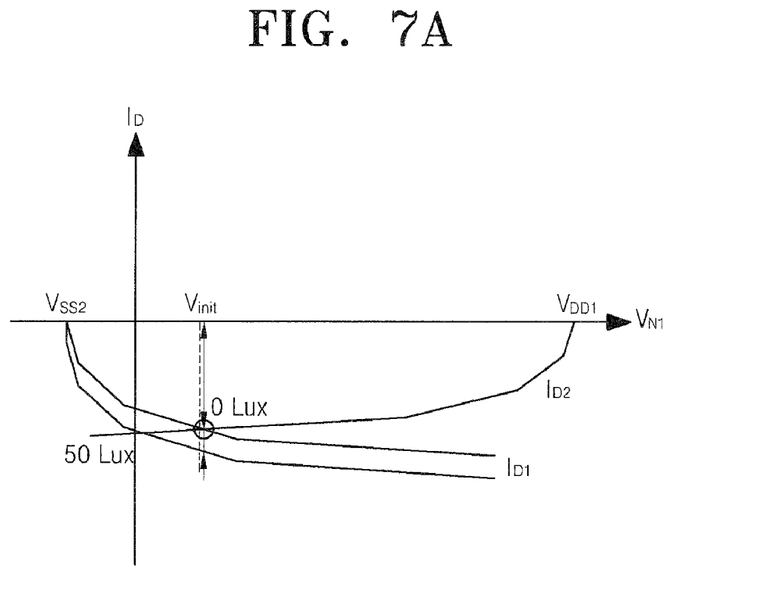
FIGS. 7A and 7B are graphs illustrating current flowing in a photodiode of a touch panel driving circuit according to an embodiment of the present invention.
Figure 7B:
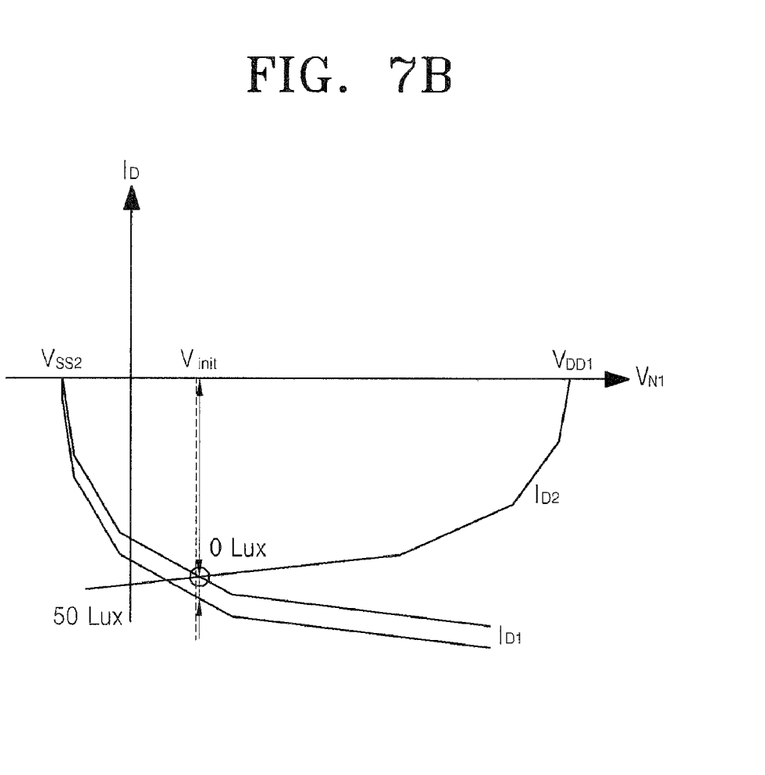

FIGS. 7A and 7B are graphs illustrating current flowing in the first and second photodiodes D1 and D2 of one of the touch panel driving circuits of FIGS. 3 to 5. FIG. 7A is a graph of voltage-current measured at room temperature, and FIG. 7B is a graph of voltage-current measured when a finger contacts a touch panel including one of the touch panel driving circuits of FIGS. 3 to 5 (wherein the temperature at which the finger contacts the touch panel is at about the body temperature).

FIGS. 7A and 7B illustrate two voltage-current curves with respect to the first photodiode D1 (at 0 Lux and 50 Lux) and a voltage-current curve with respect to the second photodiode D2. Since the second photodiode D2 blocks light externally incident thereon, current is determined by voltages applied to the cathode electrode and the anode electrode of the second photodiode D2. Current of the first photodiode D1 is determined by not only the voltage applied to the cathode electrode and the anode electrode of the first photodiode D1, but also the brightness of the incident light. Among the curves shown in FIGS. 7A and 7B, the voltage-current curve at 0 Lux of incident light has a lower absolute value of current than that of the voltage-current curve at 50 Lux of incident light.

Hereinafter, the graphs of FIGS. 7A and 7B will be described in more detail.

In FIG. 7A, the first current $I_{D1}$ is a current flowing in the first photodiode D1. When the voltage of the second ground voltage source $V_{SS2}$ is applied to the anode electrode of the first photodiode D1, current does not flow in the first photodiode D1 when the voltage of the first node N1 is $V_{SS2}$. As the voltage of the first node N1 is increased, the first current $I_{D1}$ is increased. As described above, since the current of the first photodiode D1 is also affected by brightness of incident light, the current at 50 Lux is greater than the current at 0 Lux.

The second current $I_{D2}$ is a current flowing in the second photodiode D2. When the voltage of the first voltage source $V_{DD1}$ is applied to the cathode electrode of the second photodiode D2, current does not flow in the second photodiode D2 when the voltage of the first node N1 is $V_{DD1}$. As the voltage of the first node N1 is decreased, the second current $I_{D2}$ is increased.

The initiation voltage $V_{init}$ may be set such that the first current $I_{D1}$ is identical (or substantially identical) to the second current $I_{D2}$ when the voltage of the first node N1 is the initiation voltage $V_{init}$. That is, if light is not incident on the touch panel driving circuit, the first current $I_{D1}$ flowing out of the first node N1 is identical (or substantially identical) to the second current $I_{D2}$ flowing into the first node N1, and thus it seems that the first node N1 is in a state of equilibrium.

The above-described process may also be applied to the graph of FIG. 7B, and thus a detailed description thereof will not be provided.

Absolute values of the current shown in FIG. 7B are greater than those of absolute values of the current shown in FIG. 7A. That is, if the temperature around the first photodiode D1 and the second photodiode D2 is increased, the current flow is increased. That is, even if 50 Lux of light is incident on the same touch panel driving circuits, a larger amount of the current flows when the temperature is higher.

If the touch panel driving circuit does not include the second photodiode D2, when 50 Lux of light is incident on the touch panel driving circuit, the voltage of the gate electrode of the second transistor Tr2 is determined by the first current $I_{D1}$. In addition, the output current $I_{out}$ is determined by the voltage of the gate electrode of the second transistor Tr2. Thus, the output current out may vary according to the temperature even if light having the same brightness is incident thereon. Thus, reliability of the result may be decreased.

However, when the touch panel driving circuit includes the second photodiode D2, when 50 Lux of light is incident on the touch panel driving circuit, the voltage of the gate electrode of the second transistor Tr2 is determined by the current difference between the first current $I_{D1}$ and the second current $I_{D2}$. The difference between the first current $I_{D1}$ and the second current $I_{D2}$ is substantially the same in FIGS. 7A and 7B in which the temperatures are different. That is, even if the temperature around the first and second photodiodes D1 and D2 is changed by the contact of the finger, the output current Iout is set to have the same value when the brightness of the incident light is the same. Thus, reliability of the result may be improved.

Figure 8:
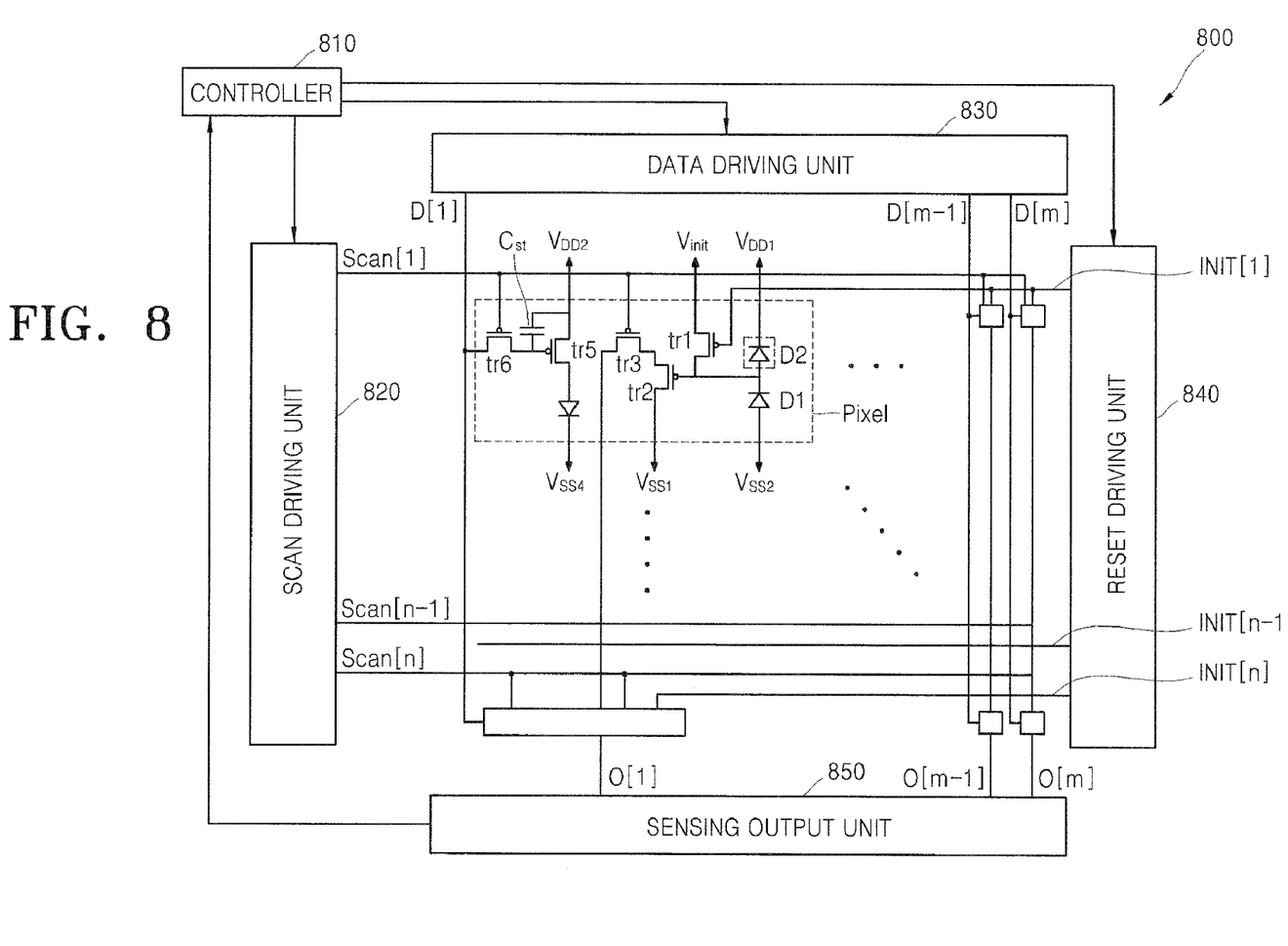
FIG. 8 schematically illustrates a touch panel including a touch panel driving circuit according to an embodiment of the present invention.

FIG. 8 illustrates a touch panel 800 including a touch panel driving circuit, according to an embodiment of the present invention.

Referring to FIG. 8, the touch panel 800 includes a controller 810, a scan driving unit 820, a data driving unit 830, a reset driving unit 840, a sensing output unit 850, and a plurality of pixels.

The touch panel 800 includes a plurality of pixels having N×M rows and columns in a display unit (or display region) of the touch panel 800. In addition, the touch panel 800 includes N scan lines Scan[1] . . . S[n] and N initiation lines INIT[1] . . . INIT[n] formed in rows, and M data lines D[1] . . . D[m] and data output lines O[1] . . . O[m] formed in columns.

Each of the pixels may include a pixel circuit and a touch panel driving circuit.

The pixel circuit may be a 2-transistor 1-capacitor type pixel circuit including a fifth transistor Tr5, a sixth transistor Tr6, a capacitor $C_{st}$, and an OLED. In the pixel circuit, data may be displayed in the same manner as in pixel circuits of conventional OLEDs, and detailed description thereof will be omitted. Furthermore, various known pixel circuits may be used.

The touch panel driving circuit of FIG. 8 may be the touch panel driving circuit of FIG. 3. However, the touch panel driving circuit is not limited thereto, and the embodiment described above may be modified in various forms.

The scan signal selecting the pixel circuit may be identical to the scan signal selecting the touch panel driving circuit, and thus the scan lines Scan[1] . . . S[n] may be shared by the pixel circuit and the touch panel driving circuit.

The controller 810 controls operations of the scan driving unit 820, the data driving unit 830, the reset driving unit 840, and the sensing output unit 850. In addition, the controller 810 receives data regarding brightness of incident light detected by the touch panel driving circuit from the sensing output unit 850.

The scan driving unit 820 applies scan signals to the scan lines Scan[1] . . . S[n]. The scan signals are sequentially applied to the scan lines Scan[1] . . . S[n], and data signals are applied to the pixel circuit in response to the scan signals. Since the scan lines Scan[1] . . . S[n] are shared by the pixel circuit and the touch panel driving circuit, the third transistor Tr3 of the touch panel driving circuit of a row selected by the scan signal is turned on ON to supply the output current $I_{out}$ to the sensing output unit 850 which will be described in more detail later.

The data driving unit 830 applies data signals to the data lines D[1] . . . D[m]. The data signals may be output from a voltage source or a current source in the data driving unit 830.

The reset driving unit 840 applies reset signals to the initiation lines INIT[1] . . . INIT[n]. The reset signals are sequentially applied to the initiation lines INIT[1] . . . INIT[n] after the scan signals are applied to the scan lines Scan[1] . . . S[n], and an initiation voltage $V_{init}$ is applied to the first node N1 when the reset signals are applied.

The sensing output unit 850 receives each of the output currents Iout from the touch panel driving circuit in the row selected by the scan signal through each of the data output lines O[1] . . . O[m]. The applied output currents $I_{out}$ are converted to brightness data corresponding to the output currents $I_{out}$ in the sensing output unit 850. For example, the output current $I_{out}$ is supplied to a capacitor of the sensing output unit 850 so that the voltage between both electrodes of the capacitor can be detected, and then the detected voltage may be converted to the brightness data. Alternately, the output current $I_{out}$ may be converted to the brightness data by detecting the output current $I_{out}$. However, the method of converting the output current $I_{out}$ to the brightness data may be modified in various suitable forms. The converted brightness data is transferred to the controller 810 to detect the contact of the finger.

According to embodiments of the present invention, a process of manufacturing a touch panel can be simplified since a pixel circuit and a touch panel driving circuit of the touch panel are formed using substantially the same process at substantially the same time, and the thickness of the touch panel may be decreased since additional layers are not necessary.

Furthermore, since the pixel circuit and the photosensing circuit share the scan lines, the number of lines necessary to drive the touch panel and the number of driving devices for generating driving signals can be reduced.

Furthermore, current generated by the heat of the finger may be removed by further including the second photodiode D2 which generates current only according to temperature by blocking externally incident light. Thus, the contact of the finger may be accurately detected by the touch panel.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A driving circuit of a photosensing touch panel comprising:
   a first photodiode coupled between a first voltage source and a sensing node and for generating a first current in accordance with a brightness of an external incident light and a heat of a finger;
   a second photodiode coupled between the sensing node and a second voltage source and for generating a second current in accordance with the heat of the finger, the second photodiode being shielded from the external incident light;
   an amplifier circuit for detecting the brightness of the external incident light regardless of the heat of the finger by subtracting the second current from the first current at the sensing node, and
   a switch coupled between the amplifier circuit and an output line and for selectively supplying a third current generated according to the brightness of the external incident light, regardless of the heat of the finger, to a data output line in accordance with a scan signal applied to the switch.

2. The driving circuit of claim 1, further comprising a capacitor coupled between the sensing node and a third voltage source and for maintaining the third current when the scan signal is applied to the switch.

3. The driving circuit of claim 1, further comprising an initializer for selectively applying an initiation voltage to the sensing node to reset both the first photodiode and the second photodiode.

4. The driving circuit of claim 3, wherein the initialization voltage applied to the sensing node is set to be a voltage when the first current is identical to the second current at 0 Lux.

5. The driving circuit of claim 1, wherein the first photodiode comprises an anode electrode connected to the first voltage source and a cathode electrode connected to the sensing node, and wherein the second photodiode comprises an anode electrode connected to the sensing node and a cathode electrode connected to the second voltage source.

6. The driving circuit of claim 5, further comprising a first transistor comprising a first electrode connected to a third voltage source, a second electrode connected to the sensing node, and a gate electrode connected to an initiation line.

7. The driving circuit of claim 6, wherein the first voltage source has a lower voltage level than the third voltage source, and wherein the second voltage source has a higher voltage level than the third voltage source.

8. The driving circuit of claim 6, wherein the amplifier circuit comprises a second transistor comprising a first electrode, a second electrode connected to a fourth voltage source, and a gate electrode connected to the sensing node.

9. The driving circuit of claim 8, wherein each of the first voltage source and the fourth voltage source has a lower voltage level than the third voltage source, and wherein the second voltage source has a higher voltage level than the third voltage source.

10. The driving circuit of claim 8, further comprising a third transistor comprising a first electrode connected to a data output line, a second electrode connected to the first electrode of the second transistor, and a gate electrode connected to a scan line.

11. The driving circuit of claim 10, further comprising a capacitor comprising a first terminal connected to the sensing node and a second terminal connected to a fifth voltage source.

12. The driving circuit of claim 11, wherein each of the first voltage source, the fourth voltage source, and the fifth voltage source has a lower voltage level than the third voltage source, and wherein the second voltage source has a higher voltage level than the third voltage source.

13. The driving circuit of claim 11, further comprising a fourth transistor comprising a first electrode connected to the second electrode of the second transistor, a second electrode connected to the fourth voltage source, and a gate electrode connected to the scan line.

14. The driving circuit of claim 13, wherein the third transistor is for selectively supplying a third current, generated according to the brightness of the external incident light regardless of the heat of the finger, to the data output line in accordance with a scan signal, and wherein the fourth transistor is for selectively floating the second transistor in accordance with the scan signal.

15. A photosensing touch panel comprising:
   a pixel circuit;
   a touch panel driving circuit; and
   a scan line shared by both the pixel circuit and the touch panel driving circuit, the pixel circuit being configured to receive a data signal from a data line in response to a scan signal applied to the scan line, and the touch panel driving circuit comprising:
- a first photodiode coupled between a first voltage source and a sensing node and for generating a first current in accordance with a brightness of an external incident light and a heat of a finger;
- a second photodiode coupled between the sensing node and a second voltage source and for generating a second current in accordance with the heat of the finger, the second photodiode being shielded from the external incident light;
- an amplifier circuit for detecting the brightness of the external incident light regardless of the heat of the finger by subtracting the second current from the first current at the sensing node; and
- a switch coupled between the amplifier circuit and an output line and for selectively supplying a third current, generated according to the brightness of the external incident light regardless of the heat of the finger, to a data output line in accordance with the scan signal applied to the scan line.

16. The photosensing touch panel of claim 15, wherein the touch panel driving circuit comprises a capacitor coupled between the sensing node and a third voltage source and for maintaining the third current when the scan signal is applied to the scan line.

17. The photosensing touch panel of claim 15, wherein the touch panel driving circuit comprises an initializer for selectively applying an initiation voltage to the sensing node to reset both the first photodiode and the second photodiode.

18. The photosensing touch panel of claim 15, wherein the first photodiode comprises an anode electrode connected to the first voltage source and a cathode electrode connected to the sensing node, and wherein the second photodiode comprises an anode electrode connected to the sensing node and a cathode electrode connected to the second voltage source.

19. The photosensing touch panel of claim 18, wherein the touch panel driving circuit comprises a first transistor comprising a first electrode connected to a third voltage source, a second electrode connected to the sensing node, and a gate electrode connected to an initiation line.

20. The photosensing touch panel of claim 19, wherein the amplifier circuit comprises a second transistor comprising a first electrode, a second electrode connected to a fourth voltage source, and a gate electrode connected to the sensing node.

21. The photosensing touch panel of claim 20, wherein the switch comprises a third transistor comprising a first electrode connected to the data output line, a second electrode connected to the first electrode of the second transistor, and a gate electrode connected to the scan line.

22. The photosensing touch panel of claim 21, wherein the touch panel driving circuit comprises a capacitor comprising a first terminal connected to the sensing node and a second terminal connected to a fifth voltage source.

23. The photosensing touch panel of claim 22, wherein the touch panel driving circuit comprises a fourth transistor comprising a first electrode connected to the second electrode of the second transistor, a second electrode connected to the fourth voltage source, and a gate electrode connected to the scan line.

24. The photosensing touch panel of claim 23, wherein each of the first voltage source, the fourth voltage source, and the fifth voltage source has a lower voltage level than the third voltage source, and wherein the second voltage source has a higher voltage level than the third voltage source.

25. The photosensing touch panel of claim 15, wherein the pixel circuit comprises an organic light emitting diode (OLED).

26. The photosensing touch panel of claim 15, further comprising:
- a scan driving unit for applying the scan signal to the scan line;
- a data driving unit for applying the data signal to the data line; and
- a sensing output unit for receiving the third current from the data output line and for converting the third current to brightness data.

27. The photosensing touch panel of claim 26, further comprising:
- a controller for controlling operations of the scan driving unit, the data driving unit, and the sensing output unit and for receiving the brightness data from the sensing output unit.

28. The photosensing touch panel of claim 26, further comprising:
- a reset driving unit for applying a reset signal to an initiation line connected to the initializer.

29. The photosensing touch panel of claim 28, further comprising:
- a controller for controlling operations of the scan driving unit, the data driving unit, the reset driving unit, and the sensing output unit and for receiving the brightness data from the sensing output unit.

* * * * *